Nov. 12, 1946.  C. E. TACK  2,411,067

BRAKE ROTOR

Filed Jan. 17, 1944

INVENTOR.
Carl E. Tack
BY
Atty.

Patented Nov. 12, 1946

2,411,067

UNITED STATES PATENT OFFICE 2,411,067

BRAKE ROTOR

Carl E. Tack, Chicago, Ill., assignor to American Steel Foundries, Chicago, Ill., a corporation of New Jersey Application January 17, 1944, Serial No. 518,496

11 Claims. (Cl. 188—218)

My invention relates to brake discs and more particularly to a brake rotor of the centrifugal or blower type, capable of circulating a fluid cooling medium therethrough during rotation thereof.

The principal object of my invention is to design a rotor of the above-described type in which a brake ring is provided having two spaced annular friction plates with blower blades extending therebetween. A support hub member is connected to the radially inner extremities of the blades intermediate the friction plates; and, in order to afford a strong connection between the hub member and the blades, the latter are constructed of Y shape.

My novel rotor is especially adapted for connection to the wheel of a railway car truck. However, it will be understood that the rotor may be utilized in any arrangement and in any suitable fluid cooling medium to which it may be adapted.

Figure 1:
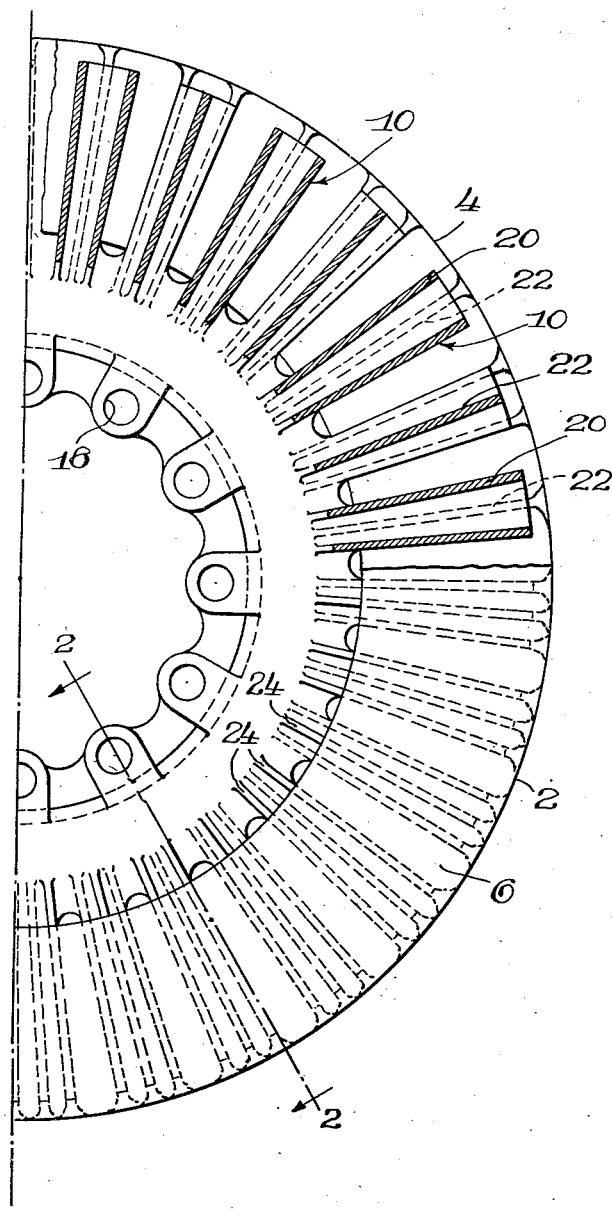
Figure 1 is a fragmentary side view of a brake rotor embodying my invention, the upper portion of Figure 1 being a sectional view taken in the plane indicated by the line 1—1 of Figure 2 and the lower portion of Figure 1 being a side elevation.
Figure 2:
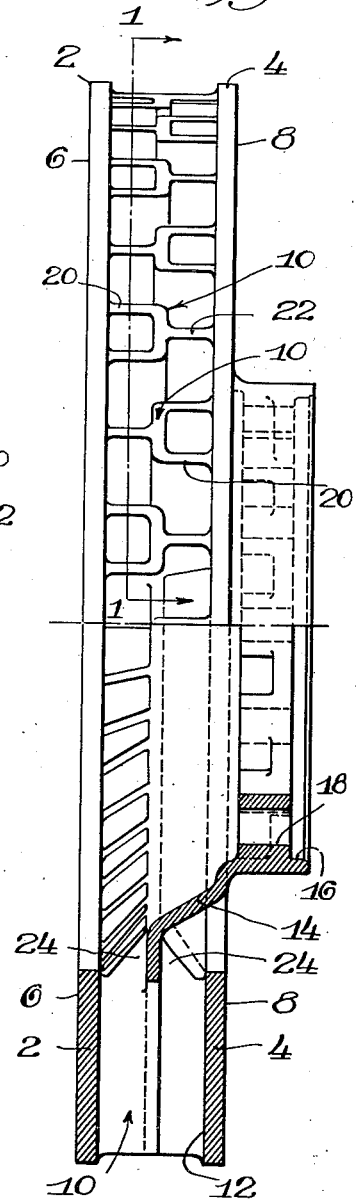
Figure 2 is a composite view, the top half thereof being an edge elevation taken from the right as seen in Figure 1 and the bottom half thereof being a sectional view taken on the line indicated by the line 2—2 of Figure 1.

Describing my invention in detail, the rotor comprises a pair of spaced annular plates 2 and 4, presenting friction faces 6 and 8, respectively, on their remote surfaces. Extending between the plates 2 and 4 are a plurality of blades generally designated 10, 10. It will be understood that the plates 2 and 4 define a fluid chamber 12 therebetween, the blades 10, 10 functioning to throw fluid radially outwardly from the chamber 12 during rotation of the rotor, fluid being drawn into the chamber 12 at opposite sides of the hub member 14, as will be clearly understood by those skilled in the art.

The hub member 14 is a generally bell-shaped member comprising on its inner perimeter the bore 16 adapted for the reception of a portion of a rotating element, such as the wheel of a wheel and axle assembly, to which the rotor is attached by means extending through openings 18, 18 through the hub member 14. The member 14 is connected at its outer perimeter to the blades 10, 10; and it may be noted that each blade 10 is a generally Y-shaped member having a U-shaped portion 20, the spaced legs of which are attached to the adjacent plate 2 or 4 and the base of which merges with the leg 22 of the Y, said leg being connected to the opposite plate.

The member 14 is connected to the blades 10, 10 at the juncture of the U-shaped portions 20, 20 thereof with the portions 22, 22 thereof, or, in other words, the member 14 is connected to each Y-shaped blade 10 at the juncture of the fork of said Y with the leg 22 thereof. This arrangement is believed to be of considerable significance in that it affords a strong connection between the hub member 14 and the brake ring, capable of resisting high torque stresses which are developed in railway braking service. This connection is reinforced by gussets 24, 24 integrally formed with the blades 10, 10 at their radially inner extremities and merging with the hub member 14. It will be understood that the blades 10, 10 also function as columns to resist braking pressures applied to the surfaces 6 and 8.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake rotor, a brake ring comprising a pair of spaced annular plates defining a fluid chamber therebetween, and Y-shaped blades extending between said plates, and a hub member connected to the radially inner extremities of said blades at the juncture of the fork of each Y with the leg thereof, each blade extending radially inwardly with respect to the inner perimeters of said plates to form gussets merging with said hub member to reinforce its connection with said blades.

2. In a brake rotor, a pair of spaced annular friction plates, U-shaped blades alternately connected to respective plates, each of said blades having its spaced legs joining the associated plate, other blades alternately connected to respective plates, each of said other blades being connected to the adjacent U-shaped blade, a support hub connected to the radially inner extremities of said blades at the juncture of said U-shaped blades with said other blades, and gussets integrally formed with said blades at their radially inner extremities and merging with said hub.

3. In a brake rotor, a pair of spaced annular friction plates, U-shaped blades alternately connected to respective plates, each of said blades having its spaced legs joining the associated plate, other blades alternately connected to respective plates, each of said other blades being connected to the adjacent U-shaped blade and lying in a plane substantially parallel to the spaced legs thereof, and a support hub connected to the radially inner extremities of said blades at the juncture of said U-shaped blades with said other blades.

4. In a brake rotor, a pair of spaced annular friction plates, U-shaped blades alternately connected to respective plates, each of said blades having its spaced legs joining the associated plate, other blades alternately connected to respective plates, each of said other blades being connected to the adjacent U-shaped blade, and an annular support hub having the outer perimeter thereof disposed between said plates in spaced relation thereto and connected to the radially inner extremities of said blades.

5. In a brake rotor, a brake ring comprising spaced plates with friction surfaces on their remote sides, Y-shaped blades extending between said plates, and a support member connected to each blade at the juncture of the fork of the Y thereof with the leg of said Y.

6. In a brake rotor, a brake ring comprising a pair of spaced annular plates defining a fluid chamber therebetween, and Y-shaped blades extending between said plates, and a hub member connected to the radially inner extremities of said blades at the juncture of the fork of each Y with the leg thereof.

7. In a brake rotor, a brake ring comprising spaced plates, brace means between said plates and connected thereto for resisting braking pressures applied to the remote surfaces of said plates, said brace means comprising Y-shaped columns extending between the plates, and a support member extending between the plates in spaced relationship thereto and connected to each column at the juncture of the fork of the Y thereof with the leg of said Y.

8. In a brake rotor, a brake ring comprising a pair of spaced plates defining a fluid chamber therebetween, fluid inlet means disposed inwardly of the inner perimeter of said ring and communicating with said chamber, means for circulating fluid from said inlet means and radially outwardly between said plates from the outer perimeter of said chamber, said means comprising Y-shaped blades extending between said plates, and support means for said rotor comprising a support member connected to each blade at the juncture of the fork of the Y thereof with the leg of said Y.

9. In a brake rotor, a brake ring comprising a plurality of spaced annular plates, blades extending between said plates, said blades being of Y shape, and a support member connected to each blade at the juncture of the fork of the Y thereof with the leg of said Y.

10. In a brake rotor, a pair of spaced annular plates, Y-shaped blades extending between said plates, each of said blades being reversely arranged with respect to the blades on opposite sides thereof, and a support member connected to the radially inner extremities of said blades at the juncture of the fork of the Y thereof with the leg of said Y.

11. In a brake rotor, a pair of spaced annular plates, Y-shaped blades extending between said plates, each of said blades being reversely arranged with respect to the blades on opposite sides thereof, a support member connected to the radially inner extremities of said blades at the juncture of the fork of the Y thereof with the leg of said Y, and gussets integrally formed with said blades at their radially inner extremities and merging with said support member.

CARL E. TACK.